(No Model.)
H. K. HALLOPETER.
NUT LOCK.
No. 586,660. Patented July 20, 1897.
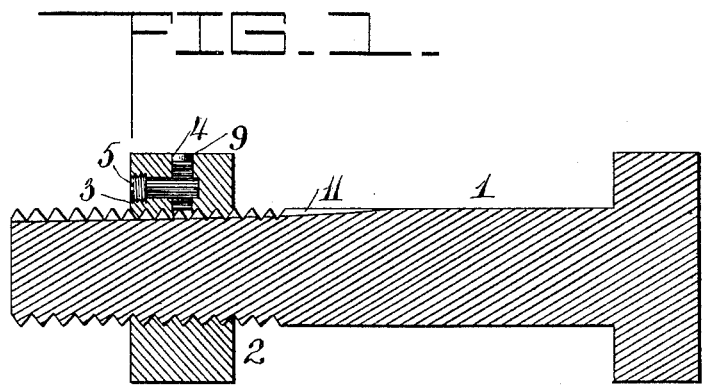
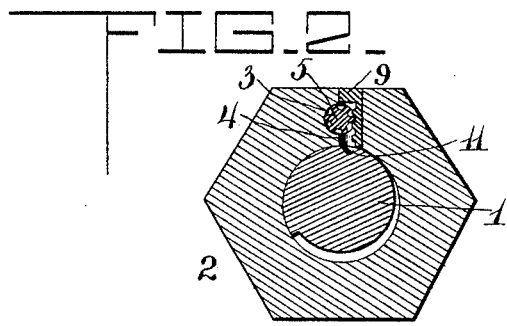
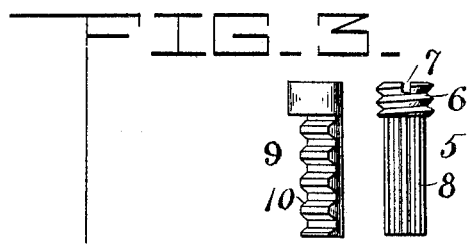
WITNESSES
W. E. Allen.
Am. Poynter
INVENTOR
Henry K. Hallopeter.
By John Hedderhein
Attorney

UNITED STATES PATENT OFFICE.

HENRY K. HALLOPETER, OF DANVILLE, PENNSYLVANIA.

NUT-LOCK.

SPECIFICATION forming part of Letters Patent No. 586,660, dated July 20, 1897.

Application filed February 1, 1897. Serial No. 621,379. (No model.)

*To all whom it may concern:*

Be it known that I, HENRY K. HALLOPETER, a citizen of the United States, residing at Danville, in the county of Montour and State of Pennsylvania, have invented certain new and useful Improvements in Nut-Locks; and I do hereby declare the following to be a full, clear, and exact description of the invention, such as will enable others skilled in the art to which it appertains to make and use the same.

My invention relates to improvements in nut-locks; and the object of the same is to provide a means for locking the nut to the bolt to prevent the same jarring or becoming disengaged therefrom and causing inconvenience or serious accident.

The invention consists in the specific construction hereinafter fully set forth, claimed, and illustrated by the accompanying drawings, in which—

Figure 1 is a longitudinal sectional view of the nut and bolt to which it is attached. Fig. 2 is a transverse sectional view of the same, and Fig. 3 is a detached view of the locking-pin and operating-screw.

Referring to the accompanying drawings, 1 indicates a bolt provided with the nut 2, of ordinary form. The horizontal perforation or passage-way 3 extends inward from one face of the nut, and the vertical perforation 4 passes through one of the edges of the nut and terminates in the said horizontal passage.

The horizontal passage 3 is screw-threaded to receive the screw-threads of the operating-screw 5. This operating-screw 5 has the head 6 formed on one end, said head provided with the slot 7 in its outer face for receiving a screw-driver or other similar tool. The head of this screw has transverse screw-threads, while the stem is provided with longitudinal ribs or projections 8. The locking-pin 9 is flattened on one side and has the teeth 10 formed therein for the purpose to be described.

In operation the nut is adjusted to the proper position upon the bolt, and the operating-screw is positioned as shown, its longitudinal ribs or projections engaging the teeth or threads of the locking-pin. The operating-screw is then screwed inward by the aid of a screw-driver, which moves the operating-pin downward and in engagement with the threads of the bolt.

The bolt may be constructed with a longitudinal channel 11, if desired, into which the locking-pin projects for locking the nut, but this is not necessary, as the nut is securely locked from rotation by the engagement of the locking-pin with the threads of the bolt.

From the above description it will be seen that I have produced a nut-lock which is very simple in its construction and most effective in preventing the accidental disengagement of the nut from its bolt from any cause.

Having thus fully described my invention, what I claim as new, and desire to secure by Letters Patent, is—

1. A nut-lock comprising a nut, a locking-pin movable therein and provided with teeth, an operating-screw formed with projections for engaging the teeth of the locking-pin, and moving the latter, in combination with a bolt upon which said nut is adapted to be adjusted and be secured in said adjustment by the engagement of the locking-pin with the threads of said bolt, substantially as described.

2. A nut-lock comprising a nut, a locking-pin movable therein and provided with transverse teeth upon one of its sides, an operating-screw formed with longitudinal projections for engaging the teeth of the locking-pin to effect the movement of the same, in combination with a bolt upon which said nut is adapted to be adjusted, the locking-pin engaging the threads of said bolt for locking the nut thereon, substantially as described.

3. The combination with a bolt, of a nut adapted to be adjusted thereon, said nut provided with a screw-threaded horizontal passage having a vertical passage communicating therewith, an operating-screw adapted to be positioned in the horizontal passage and provided with a screw-threaded head for engaging the screw-threads of said passage, and a locking-pin movable in the vertical passage and provided on one of its faces with teeth for engaging the longitudinal projections of the operating-screw, whereby when the latter is rotated the locking-pin is moved downwardly into engagement with the bolt for locking the nut thereon, substantially as described.

In testimony whereof I have signed this specification in the presence of two subscribing witnesses.

HENRY K. HALLOPETER.

Witnesses:
 FRANK YERRICK,
 WM. N. DELRITE.